Oct. 23, 1962 — J. R. WRIGHT — 3,060,301
HEATING SYSTEM

Filed Feb. 4, 1960 — 2 Sheets-Sheet 1

INVENTOR.
J RONDLE WRIGHT
BY Robert O. Spindle
ATTORNEY

To 115v. A.C. Power

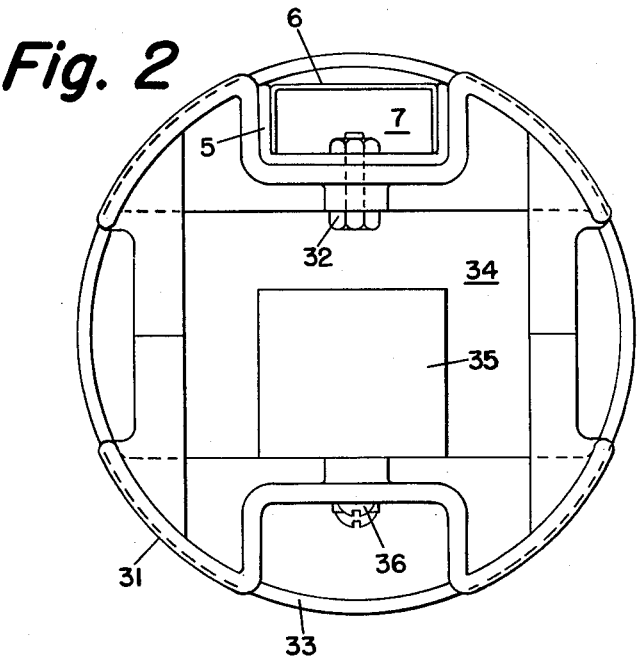

3,060,301
HEATING SYSTEM
J. Rondle Wright, Newtown Square, Pa., assignor to Sun Oil Company, Philadelphia, Pa., a corporation of New Jersey
Filed Feb. 4, 1960, Ser. No. 6,669
9 Claims. (Cl. 219—39)

This invention relates to a heating system for an enclosure, such as an enclosure wherein are positioned the principal components of an analytical or test instrument. For convenience, the present system will be described in connection with a gas chromatograph, although it is pointed out that the system is capable of use with other types of instruments which are to be maintained in heated, air-filled, suitably insulated, enclosures.

In a chromatograph, the detectors (which produce an electrical signal in response to each effluent from the chromatographic column) are normally not exactly matched, and, moreover, have different temperature coefficients of resistance. In addition, the times required for the various components or fractions of the sample mixture to pass through the fractionating column will change with temperature. Also, the quantity of the sample (i.e., the actual number of molecules) applied to the chromatograph will vary with temperature. All of the above effects, as well as others which are temperature-induced, would tend to produce inaccuracies and/or inconsistencies in the produced chromatogram.

To maintain the required accuracy and stability, thereby reducing as much as possible the aforementioned inaccuracies and inconsistencies, attempts have been made to provide instruments such as chromatographs with some sort of temperature control, so as to maintain the temperature of the same at a more or less constant value. However, simple on-off heating systems, of the type used in the prior art, are often inadequate for temperature control over wide variations in surrounding (ambient) temperatures.

An object of this invention is to provide a novel heating system for an enclosure.

Another object is to provide a heating system for a gas chromatography equipment enclosure which will operate to maintain the chromatography equipment at a substantially constant temperature (e.g., to within a few tenths of a degree F.) over a very wide ambient temperature range, on the order of 100° F. The aforesaid substantially constant or controlled temperature is preferably about 10° F. above the maximum expected ambient temperature.

A further object is to provide a heating arrangement which operates to give a very effective temperature control, yet which is very simple, and easy to maintain.

The objects of this invention are accomplished, briefly, in the following manner: an elongated fluid conduit or duct is positioned within the enclosure which is to be heated. This conduit communicates adjacent its ends with the enclosure, and the walls of this conduit support, either directly or indirectly, most of the components of the chromatograph, or other instrument. A blower, positioned adjacent one end of the conduit, continuously circulates air in a stream through the conduit and thence into and through the enclosure. Two low-power electrical heaters, of low thermal capacity, are positioned in the conduit, one being upstream and the other downstream from a thermostat which is also positioned within the conduit. A third electrical heater, of high power and high thermal capacity, is positioned adjacent the blower, in the path of the air emerging from the conduit into the enclosure. Circuit means interconnect the heaters and the thermostat in such a way that, when the temperature of the air in the conduit falls below a predetermined value, the two low-power heaters are almost instantaneously energized, while the high-power heater is energized (if at all) only after a predetermined time delay. At high ambient temperatures, the high-power heater may not be energized at all, while the lower the ambient temperature, the longer is the time that the high-power heater is "on," during the on-off heating cycle of the low-power heaters.

A detailed description of the invention follows, taken in conjunction with the accompanying drawings, wherein:

FIGURE 2 is a plan or top view of the apparatus inside the enclosure, looking in the direction 2—2 of FIGURE 1; and FIGURES 3A, 3B, and 3C are functional diagrams illustrating the operation of the system of this invention, under various conditions of ambient temperature.

Figure 1:
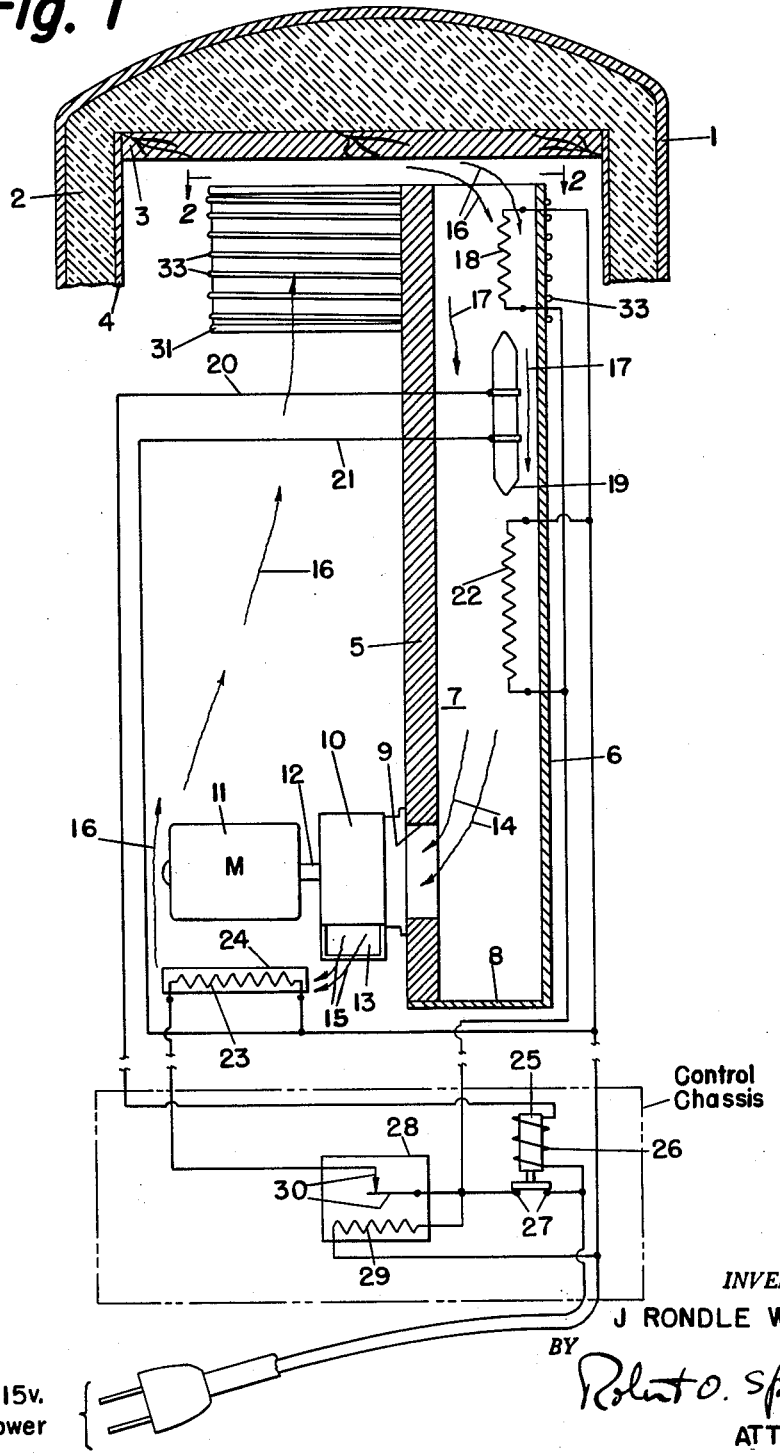
FIGURE 1 is a combined schematic and structural view illustrating the heating system of this invention.

Referring first to FIGURE 1, various components of an analytical or test instrument, e.g. a gas chromatography instrument, are mounted inside an enclosure which is to be heated by the system of this invention. The enclosure is defined by a bell-jar cover 1 (which may be the metallic cover of a Crouse-Hinds type explosion proof Condulet) which is mounted over the component parts of the instrument and the space within which provides the heated enclosure. At its lower (open) end, the cover 1 is provided with female threads (not shown) which mate with male threads provided on a lower disk-like metallic mounting plate or base (also not shown; in this way, the cover 1 is detachably secured in position over and around the instrument parts. Thermal insulating material 2 is provided in the form of a lining inside the cover 1. A wooden disk 3 maintains the lining 2 in position at the upper end of the cover 1, while a cylindrical wooden shell 4 maintains the insulating material 2 in position around the cylindrical side wall of the cover. By way of example, the volume inside the cover 1 (when the same is in its operative position) may amount to about two cubic feet.

The various component parts of the instrument are supported, either directly or indirectly, by an aluminum (heat-conducting) channel 5 which extends vertically substantially the entire length of the available space inside the cover 1. Channel 5 is provided with a cover 6 (preferably in the form of an inverted metallic channel, see FIGURE 2) to form an elongated fluid conduit 7. Elements 5 and 6 (forming the conduit 7) are suitably secured at their lower ends to a solid insulating bottom plate (not shown) which is in turn secured to the metallic base previously mentioned. In this way, the lower end of conduit 7 is closed off from the enclosure (as indicated at 8), while the upper end of this conduit is open to the enclosure.

Near (adjacent) the lower end of conduit 7, channel 5 has therein an aperture 9. A vaned centrifugal blower 10 of well-known type is positioned so that its axis or intake portion is aligned with the center line of aperture 9. Thus, the intake for blower 10 is from the lower end of conduit 7. Blower 10 is mounted, for example, by being fastened to the bottom insulating plate previously mentioned. Blower 10 is driven by an electric motor 11 whose output shaft 12 is suitably coupled to the rotatable cage or vane assembly of the blower.

Blower 10 has a discharge duct 13 on its periphery, as is usual with small blowers of this type, the outer end of this discharge duct being open to the space inside the cover 1. The action of the blower 10 will now be described. Air is abstracted from the lower end of conduit 7, as indicated by arrows 14, and is discharged out into the enclosure by way of discharge duct 13, as indicated by arrows 15. The air flow is then upwardly in the enclosure and into the upper (open) end of conduit 7, as indicated by arrows 16; thence, the air flows downwardly through conduit 7 toward the bottom thereof, as indicated by arrows 17. It may thus be seen that when motor 11 is energized, blower 10 continuously circulates air through conduit 7, the direction of air flow being vertically downwardly within this conduit. Likewise, the air is circulated, by the blower, within the enclosure but outside the conduit, as indicated at 15 and 16. The blower 10 circulates air at a rate of about ten cubic feet per minute; since the entire volume of the enclosure is about two cubic feet, it may be considered that there are about "five changes per minute" of the air in the enclosure, although in the strict sense, the air is not actually "changed."

A first low-power (e.g., about five watts) electrical heater 18 is mounted in the fluid conduit 7, near the upper end thereof, in such a position that the air 16 from the main portion of the enclosure passes over this heater. The controlled heater 18 is intended to have low thermal capacity, and may therefore comprise bare wire wound on a thin mica sheet form; the mica sheet is suitably fastened to channel 5, to support heater 18 in position in the conduit.

Downstream from heater 18, and thus in the path of the air which has just passed over heater 18, is a thermostat 19, which is preferably of the mercury-in-glass type. To secure this thermostatic means 19 in position in conduit 7, the thermostat is clamped to a base of insulating material (e.g., the material known as Bakelite), and this base is bolted to the channel 5. The thermostat is connected to two electrical leads 20 and 21, and this thermostat operates to break the circuit between these leads when the temperature inside conduit 7 drops below a predetermined level (i.e., when the thermostat is calling for more heat), and to complete a circuit between leads 20 and 21 when the temperature being sensed rises above this predetermined level (i.e., when the thermostat is satisfied).

A second controlled electrical heater 22 is mounted in the fluid conduit 7, downstream from thermostat 19. The heater 22 is intended to have low thermal capacity, and may therefore be similar in construction and mounting to heater 18. Heater 22 is of moderately low power (e.g., about 15 watts), but is of higher power than heater 18.

It may be seen that the air 16 enters at the top of the conduit 7, passes over the small heater 18, across the thermostat 19, past the larger controlled heater 22, and out through the blower 10 near the bottom of the conduit.

An auxiliary electrical heater 23 of high power (e.g., about 200 watts) is mounted directly in the path of the output 15 of blower 10. This heater is mounted through heat-insulating spacers to the insulating bottom plate previously mentioned. Thus, the output of the blower is directed at auxiliary heater 23. The auxiliary heater 23 is enclosed in a metal container or cover 24 and therefore has a high thermal capacity.

The controlled heaters 18 and 22 are connected electrically in parallel, so that they are operated together. These heaters are operated by the thermostat 19 through a relay 25, which latter has a coil 26 and controls a pair of contacts 27. When relay 25 is de-energized, its contacts 27 close; this relay is illustrated in the de-energized position in FIGURE 1. It may be seen that heaters 22 and 18 are connected to a power source (115 volts, alternating current) in series with contacts 27, so that when these latter contacts are closed heaters 22 and 18 are energized or "on," but when contacts 27 are open heaters 22 and 18 are unenergized or "off." The relay coil 26 is connected to the alternating current power source by way of thermostat leads 20 and 21, so that when the circuit between leads 20 and 21 is broken due to the action of the thermostat 19, relay coil 26 is de-energized to close contacts 27; when the circuit between leads 20 and 21 is completed due to the thermostat action, relay coil 26 is energized and contacts 27 are opened.

The auxiliary heater 23 is operated through a thermal delay (time delay) relay 28. This thermal delay relay includes a heating winding 29 which is connected in parallel with heaters 18 and 22 (i.e., also in series with contacts 27). The heating winding 29 controls a pair of contacts 30 which are normally open, although (for a reason which will appear hereinafter) they are illustrated as closed in FIGURE 1. A time delay of about fifteen seconds is provided by the thermal delay relay 28. That is to say, contacts 30 are normally open, but about fifteen seconds after heating winding 29 is energized, the contacts 30 are closed due to the action of item 29. In other words, relay 28 acts to provide a time delay in closing, the contacts 30 closing about fifteen seconds after heating winding 29 is energized (heating winding 29 being energized when relay contacts 27 close). When the contacts 30 close, the auxiliary heater 23 is connected in parallel with heaters 18 and 22, and is thus energized from the alternating current power source. Thus, it may be seen that the auxiliary heater 23 is controlled by the time delay relay 28, as well as by the relay 25, and that the contacts 27 and 30 must both be closed in order for heater 23 to be energized.

The operation of the various heaters to provide a heating cycle will now be explained. When the temperature of the air in the conduit 7 tends to fall below a predetermined value, the thermostat 19 responds by calling for more heat; then, the circuit between leads 20 and 21 is broken, de-energizing the relay coil 26 in circuit therewith and closing relay contacts 27, as illustrated in FIGURE 1. This completes the energization circuit for heaters 18 and 22, turning these controlled heaters "on." When contacts 27 close, power is also supplied to the heating winding 29 of the time delay relay 28. If the thermostat is not satisfied (i.e., if the sensed temperature in the conduit 7 does not tend to rise above the predetermined value) before the elapse of the time delay afforded by relay 28, then contacts 30 close (as illustrated in FIGURE 1), energizing or turning "on" the auxiliary heater 23. The auxiliary heater 23 then stays on until the thermostat is satisfied, at which time a circuit is completed between leads 20 and 21, energizing relay 25 to open its contacts 27 and thus de-energize or turn "off" all of the heaters 18, 22, and 23.

The heating cycle described averages about forty seconds in length. The time delay for the auxiliary heater 23 (that time delay provided by relay 28) should be about twenty to forty percent of the heating cycle length.

In warm surroundings (i.e., in a warm ambient) the controlled heaters 18 and 22 can supply the heat requirements in less than fifteen seconds of each heating cycle. Thus, the auxiliary heater 23 never comes on (since the time delay of relay 28 is fifteen seconds). However, when the outside or ambient temperature is low, the auxiliary heater 23 will come "on" for a small portion of each heating cycle, and will supply the major portion of the heat requirements of the unit (due to the high power of this heater).

FIGURES 3A, 3B, and 3C illustrate three typical operating conditions, for low, medium, and high ambient temperatures, respectively.

The low ambient temperature of FIGURE 3A might be around 0° F. This figure indicates that the "conduit" or controlled heaters 18 and 22 are on for twenty-five seconds, out of the forty-second heating cycle. With a fifteen-second time delay (thermal delay of relay 28), the auxiliary heater 23 is then "on" for ten seconds during each heating cycle. If the controlled heaters have a total power of twenty watts and the auxiliary heater 200 watts, the total average power required under these conditions is 62.5 watts.

FIGURE 3B illustrates the operation at a medium ambient temperature, say about 50° F. The "conduit" heaters 18 and 22 are "on" for twenty seconds out of the forty-second cycle. Note that in this case the auxiliary heater 23 is "on" for only about five seconds during each cycle, because of the fifteen-second time delay. The total average power required under these conditions is 35 watts.

FIGURE 3C illustrates the operation at a high ambient temperature, say about 100° F. Here, little heat is required; the "conduit" heaters 18 and 22 are "on" for fifteen seconds out of the forty-second cycle, and because of the time delay, the auxiliary heater 23 does not come "on" at all. The total average power required under these conditions is only 7.5 watts.

It will be noted, from FIGURES 3A–3C, that the length of the heating cycle (operating cycle of the thermostat) is affected very little, for a wide range of heat requirements. Thus, it is possible to maintain an accurate temperature regulation, over a wide range of ambient temperatures. By way of example, using the heating system of this invention, gas chromatography instruments (mounted in an enclosure such as that illustrated, inside cover 1) have been maintained at a substantially constant temperature (to within a few tenths of a degree, F.) over an ambient temperature range of 0° to 100° F. The temperature inside the enclosure must be about 10° F. above the maximum ambient temperature expected.

Certain important considerations must be kept in mind when designing a system according to this invention, to provide the optimum type of operation. (1) The air must circulate freely and rapidly throughout the instrument enclosure. (2) The controlled heaters 18 and 22 must have a low thermal capacity, so that the heat is transferred quickly from the heaters to the air in the conduit 7. This item is met herein by the construction of heaters 18 and 22 as bare wire wound on thin sheet insulating forms. (3) The controlled heater must be divided (separated into the two portions 18 and 22, respectively) to give a convenient length of heating cycle. In the gas chromatography instrument described herein, the upper heater 18 has a power of about five watts, and the lower heater 22 has a power of about fifteen watts. This gives a heating cycle of about forty seconds. If the two controlled heaters were of equal powers, about ten watts each, the heating cycle would be much shorter, perhaps about twenty-five seconds in total length. This short a heating cycle is undesirable, since there is then not enough time for the auxiliary heater 23 to perform any function (because of the time delay of relay 28). (4) The length of the heating cycle depends on the geometry of the conduit 7, and the air flow rate. This length can be adjusted to a convenient value, by the proper division of the power of the controlled heaters. See item (3) above.

As previously stated, various component parts of a gas chromatography instrument are supported by the upstanding channel 5. By way of example, the manner of support of the chromatographic column and of the detector cells is illustrated in FIGURES 1 and 2; various other component parts have been eliminated from the drawing, so as not to overly complicate the same. A fluid sampling valve unit may be mounted in the heated enclosure and supported indirectly by channel 5; a sampling valve which may be used here is disclosed in my copending application, Serial No. 829,574, filed July 27, 1959, now Patent No. 3,021,713, issued February 20, 1962. A sample conditioner unit may be mounted in the heated enclosure and supported indirectly by channel 5; a sample conditioner which may be used here is disclosed in my copending but now abandoned application, Serial No. 7,626, filed February 9, 1960. A flow regulator (connected into the "sweep" gas line) may also be supported by channel 5.

To support the chromatographic column, a generally cylindrical yoke member 31 is utilized. Member 31 is provided with a recess in its circumference (see FIGURE 2) of sufficient size to accommodate therein the assembled conduit 7. Member 31 is fastened to the outer surface of channel 5 by means of a pair of bolts one of which is shown at 32. The several turns of the chromatographic column or separation column 33, which column ordinarily consists of a metal tube of about ¼ inch O.D. packed with an appropriate solid material, are wound in helical fashion tightly about the outer periphery of yoke member 31; due to the recess provided in this member, the turns of the column 33 extend around to the far side of the conduit 7 (i.e., they overlie the outer surface of cover 6).

The yoke member 31 has a hollow center 34, comprising an aperture which is more or less square in horizontal cross-section and extends vertically entirely therethrough. This hollow center or aperture allows the air to circulate freely throughout the center of the column 33 and the yoke member 31, on its way to the top of the conduit 7. In addition, of course, the air can flow freely through the space between the outside of the column 33 and the wooden shell 4.

A detector cell 35 (e.g., a thermal conductivity cell) is positioned in the hollow space 34, being secured to yoke member 31 as by screws 36.

By means of the structure described, the chromatographic or partitioning column and the detector cells are supported by the upstanding channel 5, near the upper end of this channel; see FIGURE 1.

I claim:
1. A heating system for an enclosure comprising an elongated fluid conduit positioned within an enclosure to be heated and communicating adjacent its ends with said enclosure, means for continuously circulating air in a stream through said conduit and thence into and through said enclosure, a first electrical heater positioned in said conduit, a second electrical heater positioned outside said conduit but in the path of the air emerging from said conduit into said enclosure, temperature-responsive means in said conduit for producing a signal when the temperature of the air therein falls below a predetermined value, circuit means interconnecting said first heater and said temperature-responsive means for energization of said first heater under control of said temperature-responsive means and in response to said produced signal, and circuit means interconnecting said second heater and said temperature-responsive means for energization of said second heater under control of said temperature-responsive means, said last-mentioned circuit means including means for causing a predetermined delay between the production of said signal and the energization of said second heater.

2. A heating system as defined in claim 1, wherein said first heater has a low thermal capacity, and wherein said second heater has a high thermal capacity.

3. A heating system as defined in claim 1, wherein said first heater is located upstream from said temperature-responsive means.

4. A heating system as defined in claim 1, wherein said first heater is located downstream from said temperature-responsive means.

5. A system as defined in claim 1, wherein said second heater is positioned adjacent said circulating means.

6. A heating system for an enclosure comprising an elongated fluid conduit positioned within an enclosure to be heated and communicating adjacent its ends with said enclosure, means for continuously circulating air in a stream through said conduit and thence into and through said enclosure, first and second electrical heaters positioned in said conduit, a third electrical heater positioned outside said conduit but in the path of the air emerging from said conduit into said enclosure, temperature-responsive means in said conduit for producing a signal when the temperature of the air therein falls below a predetermined value, circuit means interconnecting said first and second heaters and said temperature-responsive means for energization of said first and second heaters under control of said temperature-responsive means and in response to said produced signal, and circuit means interconnecting said third heater and said temperature-responsive means for energization of said third heater under control of said temperature-responsive means, said last-mentioned circuit means including means for causing a predetermined delay between the production of said signal and the energization of said third heater.

7. A heating system as defined in claim 6, wherein said first and second heaters each have a low thermal capacity, and wherein said third heater has a high thermal capacity.

8. A heating system as defined in claim 6, wherein said first heater is located upstream from said temperature-responsive means and said second heater is located downstream from said temperature-responsive means.

9. A heating system in accordance with claim 6, wherein said first heater is of smaller power than said second heater, and wherein the powers of both said first and said second heaters are small as compared to that of said third heater.

References Cited in the file of this patent

UNITED STATES PATENTS

| | | |
|---|---|---|
| 1,087,278 | Coleman | Feb. 17, 1914 |
| 1,218,341 | Truitt | Mar. 6, 1917 |
| 1,286,576 | Freas | Dec. 3, 1918 |
| 1,884,585 | Crossley | Oct. 25, 1932 |
| 2,356,206 | Boucher | Aug. 22, 1944 |
| 2,621,423 | Clark | Dec. 16, 1952 |
| 2,896,056 | Borrup et al. | July 21, 1959 |

FOREIGN PATENTS

| | | |
|---|---|---|
| 586,606 | Great Britain | Mar. 25, 1947 |